UNITED STATES PATENT OFFICE.

ALEXANDER CLASSEN, OF AACHEN, GERMANY.

PROCESS OF CONVERTING CELLULOSE INTO SUGAR.

SPECIFICATION forming part of Letters Patent No. 696,800, dated April 1, 1902.

Application filed December 8, 1900. Serial No. 39,209. (No specimens.)

*To all whom it may concern:*

Be it known that I, ALEXANDER CLASSEN, a citizen of Germany, residing at Aachen, in the Empire of Germany, have invented certain new and useful Improvements in the Process of Converting Cellulose into Fermentable Sugar, (for which I have made application for patents in the following countries—viz., Germany, May 11, 1900, June 13, 1900, and June 18, 1900, and France, November 5, 1900,) of which the following is a specification.

My invention especially relates to the process described in the specification forming part of my Letters Patent No. 654,518, dated July 24, 1900, and has for its object to modify the process referred to as regards the means for oxidizing the sulfurous acid and the temperature at which the process is carried out.
According to my Patent No. 654,518 the cellulose is converted into sugar by heating the cellulose in a closed vessel at a temperature of 120° to 145° centigrade with a solution containing sulfurous and sulfuric acid.
Instead of adding sulfuric acid the latter may be formed in the vessel by introducing atmospheric air or other gaseous mixtures rich in oxygen or oxidants capable of oxidizing sulfurous acid to sulfuric acid—for instance, peroxides and the like.

Instead of using the substances just referred to the oxidation of the sulfurous acid is effected by chlorin or chlorin-yielding substances—for instance, hypochlorites—whereby hydrochloric acid is formed, beside sulfuric acid, according to the following formula:

$$SO_2 + Cl_2 + 2H_2O = H_2SO_4 + 2HCl,$$

so that two acids are reacting *in statu nas-* *cendi.*

In carrying out my process I heat the wood or the like with sulfurous acid in a closed vessel to 120° to 145° centigrade and then introduce so much chlorin water or chlorin-yield-
ing substances that at least 0.2 per cent. sulfuric acid is formed.

Having thus described the nature of this invention and the manner in which it is carried out, I claim—

1. A process of converting cellulose into sugar consisting in heating cellulose in a closed vessel with sulfurous acid to a temperature from 120° to 145° centigrade, introducing into the mass chlorin to convert part of the sulfurous acid into sulfuric acid, then further heating the mass thus obtained, and then suitably boiling the mass.

2. A process of converting cellulose into sugar consisting in heating cellulose with sulfurous acid to a suitable temperature, introducing into the mass chlorin to convert part of the sulfurous acid into sulfuric acid, then further heating the mass thus obtained, and then suitably boiling the mass.

3. A process of converting cellulose into sugar consisting in heating cellulose with sulfurous acid in a closed vessel to a temperature of 120° to 145° centigrade, introducing into the mass chlorin to convert part of the sulfurous acid into sulfuric acid to effect the conversion of the mass, further heating the mass thus obtained, and then boiling the mass with water in an open vessel.

4. A process of converting cellulose into sugar consisting of heating the cellulose in a closed vessel with sulfurous acid to a suitable temperature, then adding a chlorin-yielding substance to convert the sulfurous acid into sulfuric acid to effect the conversion of the mass, then suitably heating the converted mass, and then suitably boiling the mass.

In witness whereof I have hereunto set my hand in presence of two witnesses.

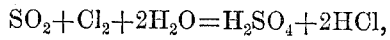
ALEXANDER CLASSEN.

Witnesses:
C. E. BRUNDAGE,
G. SCOTT.